(12) United States Patent
Collins

(10) Patent No.: US 7,877,908 B2
(45) Date of Patent: Feb. 1, 2011

(54) LICENSE PLATE RETENTION SYSTEM

(76) Inventor: Francis E. Collins, 126 Dartford La., Schaumburg, IL (US) 60194

( * ) Notice: Subject to any disclaimer, the term of this patent is extended or adjusted under 35 U.S.C. 154(b) by 0 days.

(21) Appl. No.: 11/688,302

(22) Filed: Mar. 20, 2007

(65) Prior Publication Data

US 2008/0229634 A1    Sep. 25, 2008

(51) Int. Cl.
*G09F 7/00* (2006.01)
*G09F 21/04* (2006.01)
(52) U.S. Cl. .................. 40/200; 40/209; 40/611.09; 40/611.1; 40/643
(58) Field of Classification Search .................. 40/200, 40/209, 611.09, 611.1, 643
See application file for complete search history.

(56) References Cited

U.S. PATENT DOCUMENTS

| | | | |
|---|---|---|---|
| 1,856,814 A | 10/1929 | Jones | |
| 2,791,046 A | 2/1954 | Goldberg | |
| 3,263,358 A | 8/1966 | Dosie et al. | |
| 4,011,675 A | 3/1977 | Herring | |
| 4,813,167 A * | 3/1989 | Means | 40/210 |
| 5,815,965 A | 10/1998 | De Greeve | |
| 5,870,841 A | 2/1999 | Brody, II et al. | |
| 6,385,876 B1 * | 5/2002 | Mc Kenzie | 40/201 |
| 6,519,882 B1 * | 2/2003 | Shuen | 40/209 |

* cited by examiner

*Primary Examiner*—Lesley Morris
*Assistant Examiner*—Syed A Islam

(57) ABSTRACT

A vehicle plate retention frame and removably affixed cover plate. The retention frame may have at least one first part of a two-part separable fastener disposed thereon. The cover plate has at least one second part of the two-part separable fastener associated therewith so that the cover plate may be removably affixed to the retention frame.

15 Claims, 5 Drawing Sheets

LICENSE PLATE RETENTION SYSTEM

BACKGROUND OF THE INVENTION

1. Field of the Invention

An apparatus and method of retaining a vehicle license plate. More particularly, an apparatus and method for removably retaining a cover plate to a vehicle license plate frame.

2. Description of the Prior Art

There are some instances when it is desirable to secure a cover plate to a vehicle. One instance is when an inventory or transit vehicle is being driven by a dealer, and dealer plates must be legally displayed when driving the vehicle on public roads. Another instance is when a vehicle is on exhibit, and a "show plate" is placed on the vehicle to display information concerning the vehicle.

In the first instance when dealer plates are in use, a dealer typically employs one of several methods to display the dealer plates. One method is to simply display the dealer plate through a rear window of the vehicle. However, in many if not all jurisdictions, it is required that there be an unobstructed view of the license plate, and that the license plate be provided illumination during dark conditions so the license plate may be easily viewed. The plate must also be legally displayed as required by the jurisdiction.

Another method is to affix the dealer plate/license plate to a flexible rubber frame that has at least one rubber flap. The rubber flap is inserted in a trunk opening of the vehicle, and the trunk lid closed on the rubber flap. With the rubber frame thus affixed to the vehicle, the dealer plate is left hanging against the vehicle. This method is problematic in that damage could be done to the trunk opening due to the close tolerances (trunk seal to trunk lid) required in this area by the auto manufacturer, the dealer plate is not secure and could hit and rub against the vehicle, damaging the vehicle, and the dealer plate is also not properly illuminated in low light conditions. Furthermore, this method is not suitable for use with vehicles that do not have a trunk.

Yet another method of affixing a dealer plate/license plate is to place the dealer plate in a magnetic holder which is magnetically affixed to the vehicle. A problem with this method is that modern vehicles are constructed with less ferrous metals, and a proper place to affix the holder may be difficult to find, or simply not be available. Also, the magnetic holder is not secure and may mar the finish of the vehicle. Furthermore, there may be the problem of properly illuminating the license plate.

Prior U.S. Pat. No. 4,813,167 granted to Means on Mar. 21, 1989 describes an apparatus and method of removably securing a license plate or other type of vehicle plate to a vehicle. In that patent, a cover plate is removably attached to at least one bolt head which extends outward from the vehicle license plate mounting bracket. The bolt head is extended further away from the vehicle if a license plate frame is used. The bolts extending from the vehicle detract from aesthetic features of the vehicle.

The apparatus in U.S. Pat. No. 4,813,167 also requires the use of special bolts and extra effort to install the bolts properly. If a vehicle is sold by a dealer, the new owner of the vehicle may then require that the apparatus be removed since it detracts from the appearance of the vehicle. A need thus exists for properly, securably and removably mounting a cover plate to a vehicle that overcomes these above-mentioned problems.

SUMMARY OF THE INVENTION

It is an intention of at least one embodiment of the present invention to provide for a vehicle plate retention frame and removably affixed cover plate. The retention frame may be provided with at least one of a first part of a two-part separable fastener, and a cover plate may be provided with a second part of the two-part separable fastener which aligns with and mates with the first part in releasable engagement when the cover plate is positioned and affixed over the retention frame. Alternatively, a cover plate holder may be provided with the second part of the two-part fastener.

It is also an intention of at least one embodiment of the present invention to provide for a method of removably affixing a cover plate to a vehicle plate retention frame.

BRIEF DESCRIPTION OF THE DRAWING FIGURES

DETAILED DESCRIPTION OF THE PREFERRED EMBODIMENTS

Figure 1:
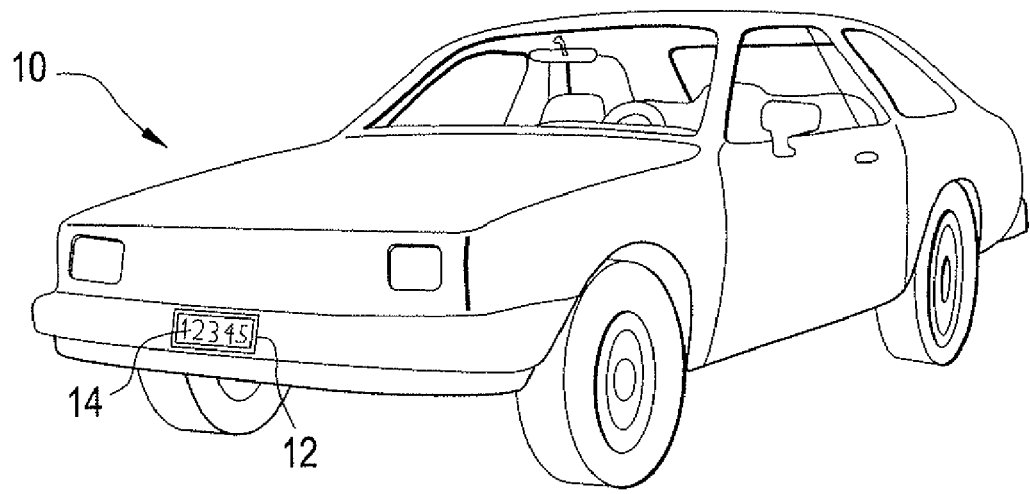
FIG. 1 shows a vehicle bearing a license plate within a retention frame.

FIG. 1 shows a vehicle 10 bearing a vehicle plate retention frame 12 which retains a vehicle plate 14. A similar retention frame and vehicle plate may also be displayed at the rear of the vehicle 10.

Figure 2:
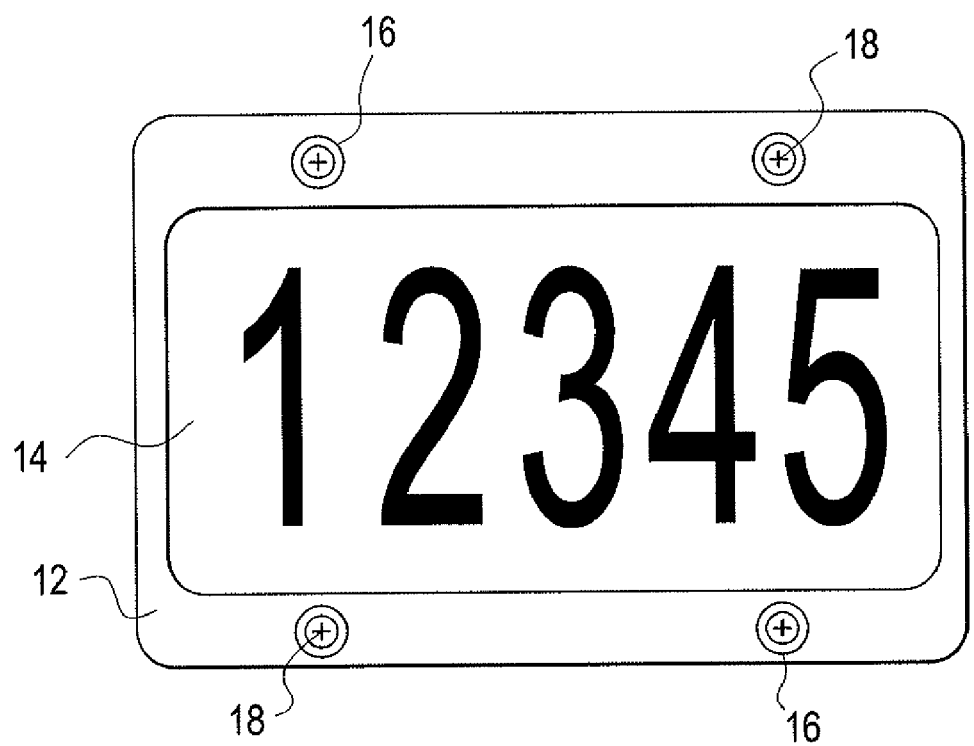
FIG. 2 shows a front plan view of a preferred embodiment of the license plate retention frame.

FIG. 2 is a more detailed view of the retention frame 12 and vehicle plate 14. The retention frame has at least one, first part 16 of a two-part fastener. It is preferred that the first parts 16 of the two-part fasteners be made integral with the retention frame 12. Retention frames may be made of any suitable material. However, retention frames are typically molded from plastic, and the first parts 16 of the two-part fasteners may be easily molded as one piece with the retention frame 12. Mounting bolts 18 extend through the retention frame 12 and into the vehicle 10 or a mounting bracket 20 provided on the vehicle, to secure the retention frame 12 to the vehicle 10.

Figure 3:
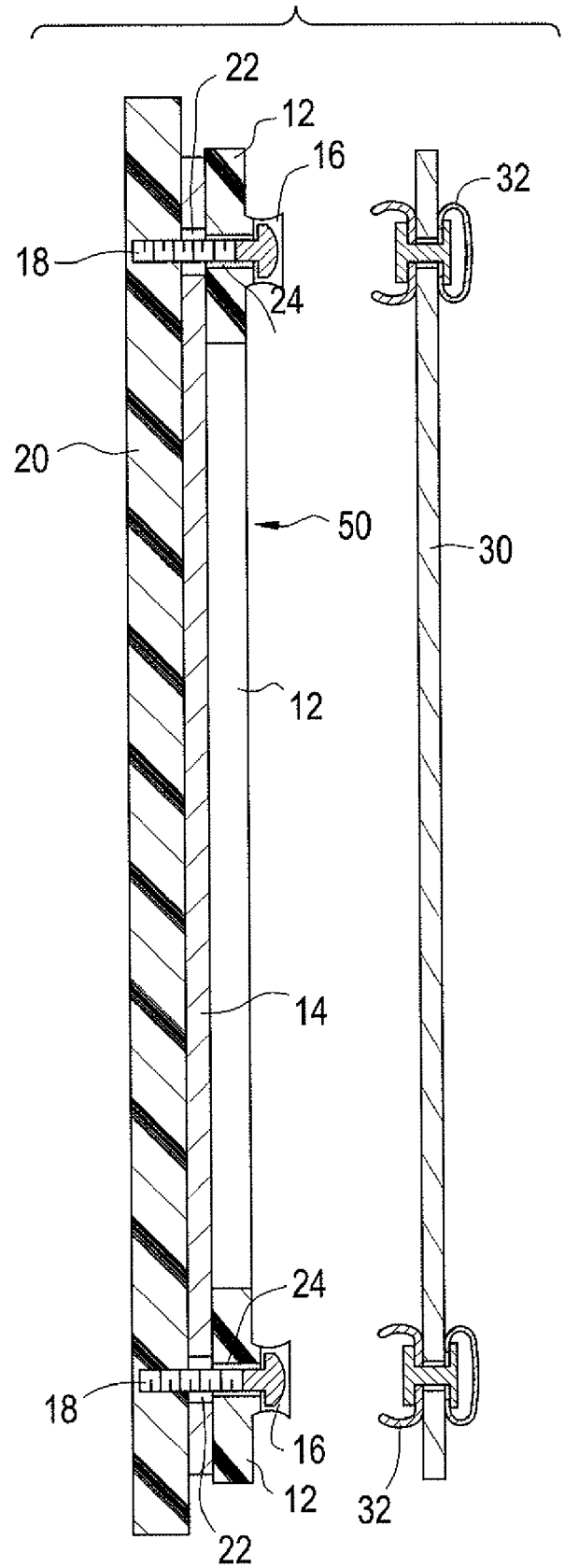
FIG. 3 shows a cross-sectional side view of the license plate retention frame of FIG. 2, and a corresponding cover plate.

As shown in FIG. 3 the mounting bolt 18 extends through the retention frame 12, through the vehicle plate 14, and into the mounting bracket 20. License plates are typically provided with mounting holes 22. It is preferred that apertures 24, through which the bolts 18 extend through the retention frame 12, are provided in a location corresponding to the location of the mounting holes 22 in a license plate, which is predominantly the vehicle plate 14 which is displayed.

The retention frame 12 may be affixed to a vehicle 10, with or without a license plate or other plate being retained thereby. It is a typical situation that a vehicle dealer will affix a vehicle plate retention frame to a vehicle without a license plate, before it is sold. The vehicle plate retention frame usually will have the name of the dealer or other advertisement. With the first part 16 of the two-part fastener being incorporated as part of the retention frame 12, this allows for easy installation of the frame, without any parts that will need adjustment or will unduly protrude from the vehicle. This arrangement will also not unduly detract from the appearance of the vehicle. These factors will be beneficial to the dealer, but yet will not detract from the vehicle, if the retention frame 12 is retained on the vehicle after it is sold, to an extent that the owner of the vehicle will be more inclined to remove the retention frame 12.

Since the appearance of the retention frame 12 is important, it is preferred that the apertures 24 through the retention frame 12 be provided at the same location as the first part 16 of the two-part fastener.

In the preferred embodiment, the two-part fastener is a snap-type friction-fit fastener. However, various types of two-part separable fasteners may be used, including, but not limited to, friction-fit fasteners, sliding-fit fasteners, hook and loop type fasteners, screw-fit fasteners, magnets, or any other two-part separable fastener known in the art.

As shown in the drawing figures, the first part 16 of the two-part fastener is a male part of a snap-fit fastener, with aperture 24 extending through the center of the first part 16. The head of bolt 18 fits within a recessed center part of the first part 16, partially hiding the head of bolt 18. As mentioned before, this is important, although not necessary, so as not to detract from the appearance of the vehicle 10.

A purpose of the retention frame 12 of the present invention is to allow a vehicle dealer, or a person exhibiting the vehicle to easily and removably affix a cover plate to the retention frame 12. As shown in FIG. 3, a cover plate 30 is provided with a second part 32 of a two-part fastener. The second part 32 is provided on the cover plate in a location corresponding to a reciprocal location of the first part 16 of the two-part fastener on the retention frame 12 when the cover plate 30 is positioned and affixed over the retention frame 12. In the preferred embodiment shown, the cover plate 30 is simply pressed against the retention frame 12 so that the female part of the second part 32 of the two-part fastener engages with the first part 16, so that the cover plate 30 is retained on the retention frame 12. To remove the cover plate 30, the cover plate 30 is pulled away from the retention frame 12 with enough force to separate the first and second parts 16, 32 of the two-part fastener.

Figure 4:
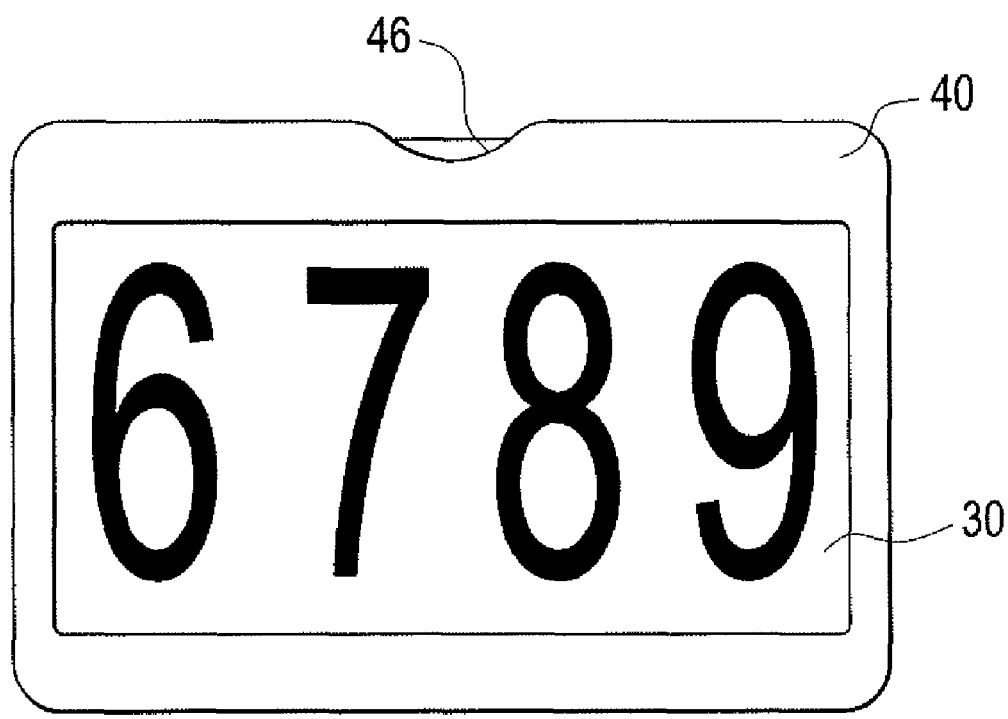
FIG. 4 shows a cover plate and a preferred embodiment of a cover plate retention bracket.
Figure 5:
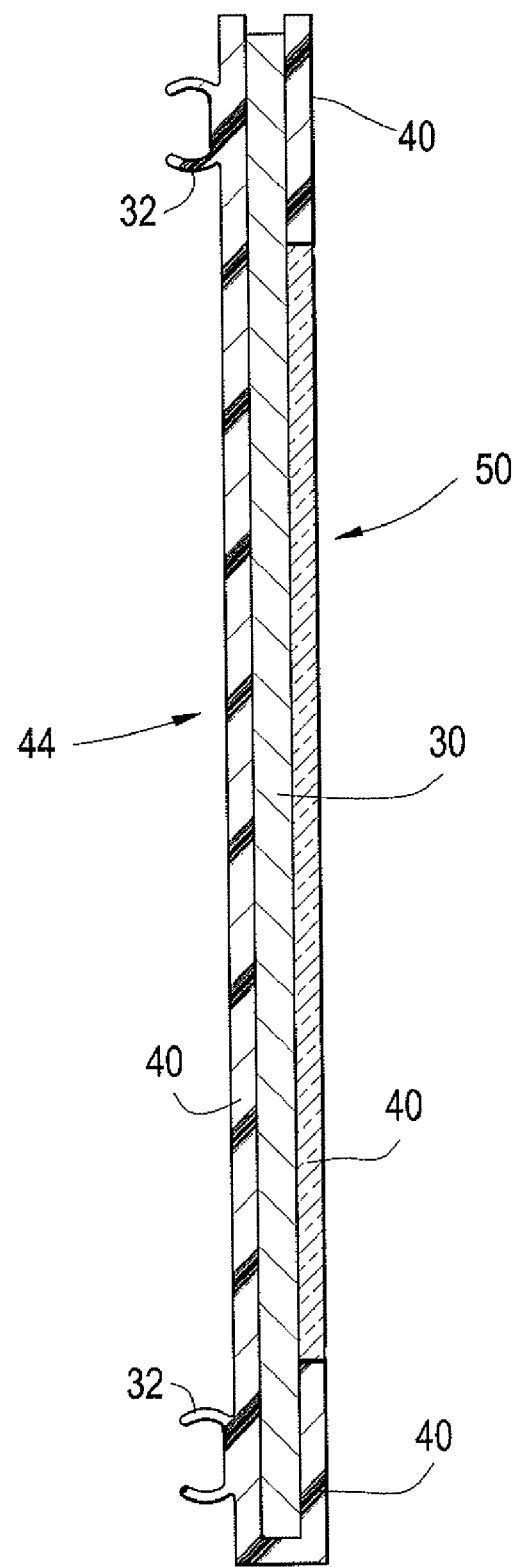
FIG. 5 shows a cross-sectional side view of the cover plate retention bracket of FIG. 4.

Dealer plates are usually reissued periodically, and it may be perceived as a nuisance to affix a second part of a two-part fastener directly to the dealer plate. In those situations, a cover plate holder 40 may be used, as shown in FIGS. 4 and 5. The holder 40 retains the cover plate 30, and the holder 40 and cover plate 30 are together removably affixable to the retention frame 12.

In the preferred embodiment that is shown, the cover plate 30 may be slid through a top opening 42 in the holder 40, and retained therein by gravity/a frictional fit. The second part 32 of a two-part fastener is incorporated into the rear side 44 of the holder 40. The second part 32 is disposed on the rear part 44 of the holder 40 to correspond with a reciprocal location of the first part 16 of the two-part fastener provided on the retention frame 12, when the holder 40 is positioned and affixed over the retention frame 12.

As shown in FIG. 4, a recess 46 may be provided in a top surface of the holder 40, through which a cover plate 30 may be grasped to extract the cover plate 30 from the holder 40.

A window 50 is provided in the front surface of each of the retention frame 12 and the holder 40 through which the underlying vehicle plate 14, cover plate 30, or other type of license plate or temporary plate may be viewed. As shown in FIG. 3, the window 50 may simply be an absence of material creating an opening in the retention frame or holder through which the underlying plate may be viewed if retained therein. Alternatively, the window 50 may include a portion of translucent material in the retention frame or holder as shown in FIG. 5. A window 50 made of a translucent material helps to protect the underlying plate from an outside environment. This is especially useful if the underlying plate is a temporary plate made from cardboard, paper, plastic or another material. The temporary plate could be a government issued temporary license plate, a show plate, an ornamental plate, an advertisement, an informational plate or otherwise, which may be desired.

Figure 6:
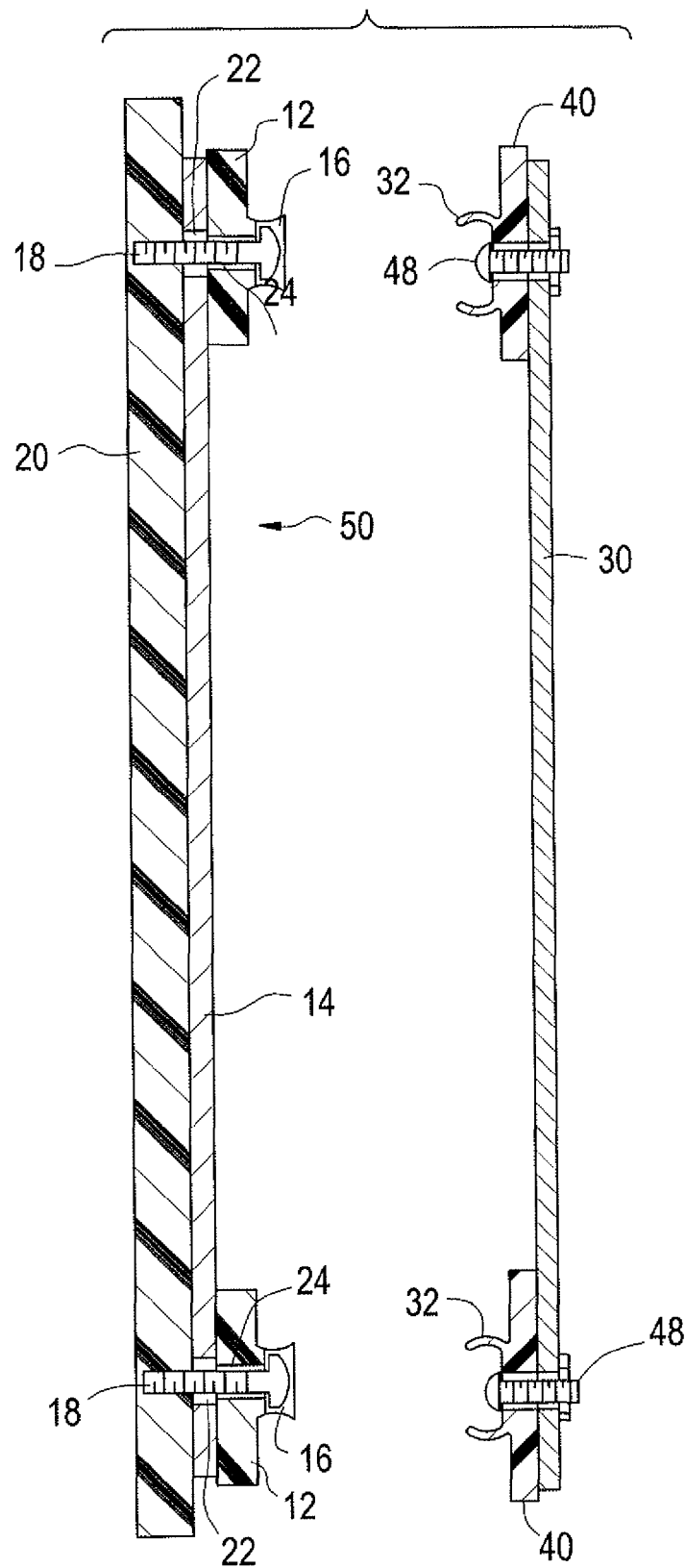
FIG. 6 shows a cross-sectional side view of an alternative embodiment of the license plate retention frame and corresponding cover plate holder.

In the preferred embodiments shown in FIGS. 1-5, retention frame 12 and holder 40 are shown as a single piece which extends over the entire forward facing outer edge portion of the vehicle plate 14. However, it is possible to provide the retention frame 12 and holder 40 as multiple parts as shown in FIG. 6. FIG. 6 depicts the retention frame 12 as having upper and lower parts. The holder 40 also is depicted as having upper and lower parts. Furthermore, as shown in FIG. 6, the holder 40 only has a rear part which is affixed, either permanently or removably by a fastener 48. Any suitable fastener known in the art may be used to affix the holder 40 to the cover plate 30. Suitable fasteners include, but are not limited to, bolts, rivets, adhesives, hook and loop type fasteners, brackets, snaps, magnets, etc.

Although the present invention has been described with reference to preferred embodiments, those skilled in the art will recognize that certain changes may be made without departing from the scope and spirit of the invention as defined in the following claims.

The invention claimed is:

1. A vehicle plate retaining system comprising:
   at least one vehicle plate retention frame part having a frame member and a frame open area bounded at least in part by the frame member, the vehicle plate retention frame part being mountable to a vehicle, and mountable over a vehicle plate such that the vehicle plate is visible from outside the vehicle and through the frame open area at a display location designated for legal license plate display;
   the frame member has a peripheral planar surface generally parallel to the open area, the peripheral planar surface extending to the outside edge of the frame member;
   at least one first part of a two-part separable fastener protrudes from the frame member peripheral planar surface of the vehicle plate retention frame part whereby when mounted to a vehicle the first part faces away from the display location;
   said first part is molded as one piece with the vehicle plate retention frame part and the molded first part protrudes beyond the peripheral planar surface;
   at least one cover plate holder, said cover plate holder has a rear part, a front part generally parallel to and spaced from the rear part to define a slot between the rear and front parts, wherein the slot is sized and configured to receive a cover plate capable of functioning as a vehicle license plate, said cover plate being different from said vehicle plate in terms of information displayed, and the cover plate holder has a window opening through which the cover plate is visible from outside of the vehicle, the cover plate thereby obscuring the vehicle plate from view;

at least one second part of the two-part separable fastener protrudes from the rear part of the cover plate holder whereby when installed the second part faces the display location, the at least one second part of the two-part separable fastener mating with and removably affixable to the at least one first part of the two-part separable fastener;

said second part is molded as one piece with the cover plate holder; and said first and second parts are sized and shaped for snap-fit engagement with each other whereby the cover plate holder removably mounts over the peripheral planar surface of the vehicle retention frame part.

2. The system of claim 1, further comprising at least one aperture in the at least one vehicle frame part through which a mounting fastener extends to mount the at least one vehicle frame part to the vehicle.

3. The system of claim 2, wherein the at least one aperture is disposed to extend through the at least one first part of the two-part separable fastener.

4. The system of claim 1, wherein the cover plate holder and the at least one second part comprise an integrally molded plastic piece.

5. The system of claim 1, wherein the vehicle plate retention frame part and the at least one first part comprise an integrally molded plastic piece.

6. The system of claim 1, further comprising a translucent window portion on the cover plate holder.

7. The system of claim 1 wherein the slot extends through a top surface of the cover plate holder to slidably receive the cover plate.

8. The system of claim 7, wherein a recess is provided in the top surface of the cover plate holder which exposes at least a portion of a top edge of the cover plate received in the slot.

9. The system of claim 1, wherein the second part of the two-part separable fastener is disposed on a rearward facing surface of the at least one cover plate holder.

10. The system of claim 1, wherein the first part of the two-part separable fastener is disposed on a forward facing surface of the at least one vehicle plate retention frame part.

11. A method of removably affixing a cover plate functioning as a license plate to a vehicle, the method comprising;

providing at least one vehicle plate retention frame part having a frame member and a frame open area bounded at least in part by the frame member, the frame member having a peripheral planar surface generally parallel to the open area and extending to the outside edge of the frame member, the frame member having at least one first part of a two-part separable fastener protruding therefrom;

said providing of vehicle plate retention frame part including molding the frame member and the first part as one piece;

positioning a vehicle plate for mounting behind the vehicle plate retention frame part;

mounting the at least one vehicle plate retention frame part to a vehicle at a display location designated for legal license plate display, said mounting being with a mounting fastener and being over the vehicle plate such that the vehicle plate is visible from outside the vehicle and through the frame open area at the display location;

providing a cover plate holder having a rear part, a front part generally parallel to and spaced from the rear part to define a slot between the rear and front parts, said providing including having a window opening of the cover plate holder and sizing and configuring the slot to receive a cover plate capable of functioning as a vehicle license plate different from the vehicle plate in terms of information displayed, the cover plate holder having at least one second part of the two-part separable fastener protruding therefrom;

said providing of cover plate holder including molding the cover plate holder and the second part as one piece, with the second part being disposed on the rear part of the cover plate holder;

removably affixing the cover plate holder to the peripheral planar surface of the at least one vehicle plate retention frame part by mating the at least one two-part separable fastener first and second parts through snap-fit engagement together of the first and second parts; and sliding the cover plate into the slot of the cover plate holder, said sliding occurring before or after said removably affixing of the cover plate holder, whereby the cover plate obscures the vehicle plate from view.

12. The method of claim 11, further comprising:
affixing a cover plate to the at least one cover plate holder.

13. The method of claim 12, where the step of affixing the cover plate to the at least one cover plate holder comprises:
mounting the cover plate in a slot provided between rear and front parts of the at least one cover plate holder.

14. The method of claim 11, further comprising:
disposing the second part of the two-part separable fastener on a rearward facing surface of the cover plate.

15. The method of claim 11, further comprising:
disposing the first part of the two-part separable fastener on a forward facing surface of the at least one vehicle plate retention frame part.

* * * * *